United States Patent
Hwang et al.

(10) Patent No.: US 12,476,330 B2
(45) Date of Patent: Nov. 18, 2025

(54) BATTERY MODULE AND BATTERY PACK INCLUDING THE SAME

(71) Applicant: LG Energy Solution, Ltd., Seoul (KR)

(72) Inventors: Sung Gyu Hwang, Daejeon (KR); Hangjune Choi, Daejeon (KR); Soo Ho Kim, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 710 days.

(21) Appl. No.: 17/776,389

(22) PCT Filed: Oct. 12, 2020

(86) PCT No.: PCT/KR2020/013828
§ 371 (c)(1),
(2) Date: May 12, 2022

(87) PCT Pub. No.: WO2021/096071
PCT Pub. Date: May 20, 2021

(65) Prior Publication Data
US 2022/0399615 A1 Dec. 15, 2022

(30) Foreign Application Priority Data
Nov. 15, 2019 (KR) .................. 10-2019-0146925

(51) Int. Cl.
*H01M 50/507* (2021.01)
*H01M 50/211* (2021.01)
(Continued)

(52) U.S. Cl.
CPC ....... *H01M 50/507* (2021.01); *H01M 50/211* (2021.01); *H01M 50/249* (2021.01);
(Continued)

(58) Field of Classification Search
CPC .................. H01M 50/507; H01M 50/502–526
See application file for complete search history.

(56) References Cited

U.S. PATENT DOCUMENTS

| 2016/0233476 A1 | 8/2016 | Okamoto et al. |
| 2017/0343615 A1 | 11/2017 | Lee et al. |

(Continued)

FOREIGN PATENT DOCUMENTS

| JP | 2014022195 A | * | 2/2014 |
| JP | 2015056342 A | | 3/2015 |

(Continued)

OTHER PUBLICATIONS

Espacenet machine translation of KR-20190124022-A (Year: 2019).*

(Continued)

*Primary Examiner* — Jonathan G Leong
*Assistant Examiner* — Katharine A Caughron
(74) *Attorney, Agent, or Firm* — Lerner David LLP (57) ABSTRACT

A battery module according to one embodiment of the present disclosure includes: a battery cell stack in which a plurality of battery cells are stacked, a bus bar frame connected to the battery cell stack, an electrode lead protruding from the battery cell stack and passing through a lead slot of the bus bar frame, and a bus bar electrically connected to the electrode lead, wherein the bus bar frame includes a base bottom portion and a first rib portion protruding from the base bottom portion, and wherein the first rib portion supports the bus bar.

8 Claims, 5 Drawing Sheets

(51) Int. Cl.
*H01M 50/249* (2021.01)
*H01M 50/516* (2021.01)
*H01M 50/536* (2021.01)

(52) U.S. Cl.
CPC ....... *H01M 50/516* (2021.01); *H01M 50/536* (2021.01); *H01M 2220/20* (2013.01)

(56) References Cited

U.S. PATENT DOCUMENTS

| | | |
|---|---|---|
| 2018/0183020 A1 | 6/2018 | Ju et al. |
| 2018/0229621 A1 | 8/2018 | Roh et al. |
| 2018/0277818 A1 | 9/2018 | Nagai et al. |
| 2019/0074557 A1 | 3/2019 | Shin et al. |
| 2019/0288264 A1 | 9/2019 | Fujita |
| 2020/0106074 A1 | 4/2020 | Gang et al. |
| 2020/0136121 A1 | 4/2020 | Allen et al. |
| 2020/0203698 A1 | 6/2020 | Jin et al. |
| 2021/0083254 A1 | 3/2021 | You et al. |
| 2021/0194101 A1 | 6/2021 | Kim et al. |

FOREIGN PATENT DOCUMENTS

| | | |
|---|---|---|
| JP | 2018055821 A | 4/2018 |
| KR | 101329251 B1 | 11/2013 |
| KR | 20140093424 A | 7/2014 |
| KR | 20160077762 A | 7/2016 |
| KR | 20180074592 A | 7/2018 |
| KR | 20180108461 A | 10/2018 |
| KR | 20180119372 A | 11/2018 |
| KR | 20190056013 A | 5/2019 |
| KR | 20190094668 A | 8/2019 |
| KR | 20190122055 A | 10/2019 |
| KR | 20190124022 A | 11/2019 |
| WO | 2018195218 A1 | 10/2018 |

OTHER PUBLICATIONS

Espacenet machine translation of JP-2014022195-A (Year: 2014).*
International Search Report for Application No. PCT/KR2020/013828 mailed Feb. 2, 2021, pp. 1-3.
Extended European Search Report including Written Opinion for Application No. 20888677.0 dated Sep. 13. 2022, pp. 1-8.

* cited by examiner

BATTERY MODULE AND BATTERY PACK INCLUDING THE SAME

CROSS-REFERENCE TO RELATED APPLICATIONS

This application is a national stage entry of PCT/KR2020/013828, filed on Oct. 12, 2020, published in Korean, which claims priority to Korean Patent Application No. 10-2019-0146925, filed on Nov. 15, 2019, the disclosures of which are hereby incorporated herein by reference in their entireties.

TECHNICAL FIELD

The present disclosure relates to a battery module and a battery pack including the same, and more particularly to a battery module with improved welding structure and a battery pack including the same.

BACKGROUND ART

Secondary batteries, which are easily applicable to various product groups and has electrical characteristics such as high energy density, are universally applied not only for a portable device but also for an electric vehicle or a hybrid electric vehicle, an energy storage system or the like, which is driven by an electric driving source. Such secondary battery is attracting attention as a new environment-friendly energy source for improving energy efficiency since it gives a primary advantage of remarkably reducing the use of fossil fuels and also does not generate by-products from the use of energy at all.

Small-sized mobile devices use one or several battery cells for each device, whereas middle- or large-sized devices such as vehicles require high power and large capacity. Therefore, a middle- or large-sized battery module having a plurality of battery cells electrically connected to one another is used.

Meanwhile, as the need for a large capacity structure is increasing along with the utilization as an energy storage source in recent years, there is a growing demand for a battery pack with a multi-module structure in which a plurality of battery modules, each including a plurality of secondary batteries connected in series and/or in parallel, are integrated.

Meanwhile, when a plurality of battery cells are connected in series or in parallel to configure a battery pack, it is common to configure a battery module composed of at least one battery cell first, and then configure a battery pack by using at least one battery module and adding other components.

The battery module includes a plurality of battery cells stacked on each other and a bus bar assembly electrically connecting electrode leads of the plurality of battery cells. Here, the bus bar assembly includes a bus bar frame having lead slots passing through the electrode leads of each battery cell, and a bus bar slot that is mounted on the bus bar frame and is provided to correspond to the number of lead slots, or has an opening part formed between the bus bars, and includes a bus bar connected to an electrode lead that has passed through bus bar slots or opening parts by welding or the like.

When connecting the bus bar to the electrode lead protruding from the battery cell stack in the battery module, the welding process can proceed. At this time, welding defects may occur depending on the bus bar or bus bar frame structure. In order to prevent these welding defects, it is necessary to improve the design of the bus bar or bus bar frame.

DETAILED DESCRIPTION OF THE INVENTION

Technical Problem

It is an object of the present disclosure to provide a battery module with improved welding structure and a battery pack including the same.

However, the problem to be solved by embodiments of the present disclosure is not limited to the above-described problems, and can be variously expanded within the scope of the technical idea included in the present disclosure.

Technical Solution

A battery module according to one embodiment of the present disclosure includes: a battery cell stack in which a plurality of battery cells are stacked, a bus bar frame connected to the battery cell stack, an electrode lead protruding from the battery cell stack and passing through a lead slot of the bus bar frame, and a bus bar electrically connected to the electrode lead, wherein the bus bar frame includes a base bottom portion and a first rib portion protruding from the base bottom portion, and wherein the first rib portion supports the bus bar.

The electrode lead may pass through the lead slot of the bus bar frame, and then be bent onto the bus bar so that the bent portion of the electrode lead is welded to the bus bar.

The first rib portion may include a first sub-rib portion and a second sub-rib portion adjacent to each other, the bus bar may include a first portion supported by each of the first sub-rib portion and the second sub-rib portion, and a second portion located between the first sub-rib portion and the second sub-rib portion, and the upper surface of the second portion may have a half blanking shape that is recessed toward the base bottom portion.

A portion to which the bus bar and the electrode lead are welded may be located on an extension line between the first sub-rib portion and the second sub-rib portion.

The electrode lead may be welded onto the first portion, and the electrode lead includes a dummy portion that is extended from the welded portion and bent toward the second portion.

The dummy portion may be bent into a recessed portion of the second portion.

The first portion of the bus bar and the second portion of the bus bar may be integrally formed.

The second portion of the bus bar may be separated from each of the first sub-rib portion and the second sub-rib portion.

The bus bar frame may further include a second rib portion located between the bus bars adjacent to each other, and the height of the second rib portion may be equal to or lower than the height of the electrode lead bent on the bus bar.

A battery pack according another embodiment of the present disclosure includes the above-mentioned battery module.

Advantageous Effects

According to the embodiment of the present disclosure, a rib is formed in the bus bar frame portion on which the bus bar is mounted, thus being able to enhance the rigidity against bending of the bus bar by the welding jig during welding.

In addition, the rib is located between the bus bars adjacent to each other, and the height of the partition ribs formed on the bus bar frame is formed to be equal to or lower than the height of the outermost electrode lead surface, thereby enabling the partition ribs not to interfere with the bending blades during welding.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a part is referred to as "including" a certain component, it means that it can further include other components, without excluding the other components, unless otherwise stated.

Further, throughout the specification, when referred to as "planar", it means when a target portion is viewed from the top, and when referred to as "cross-sectional", it means when a target portion is viewed from the side of a cross section cut vertically.

Figure 1:
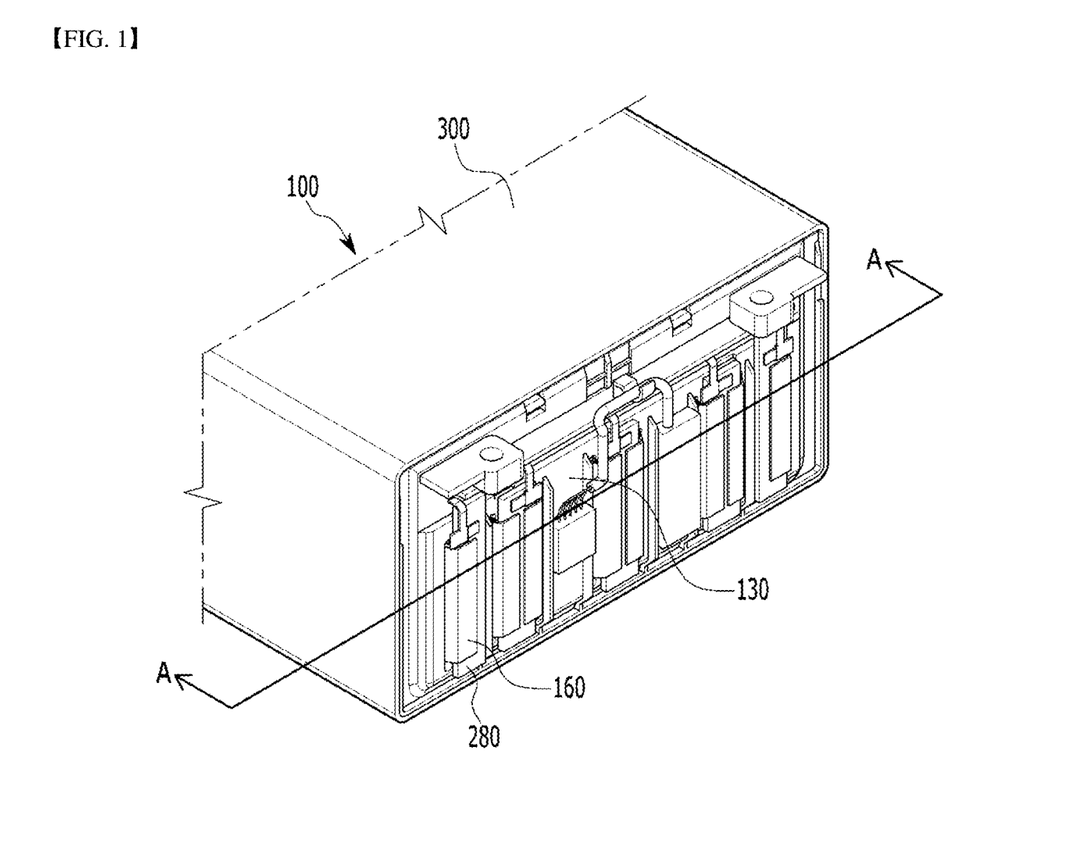
FIG. 1 is a perspective view showing a part of a battery module according to one embodiment of the present disclosure.
Figure 2:
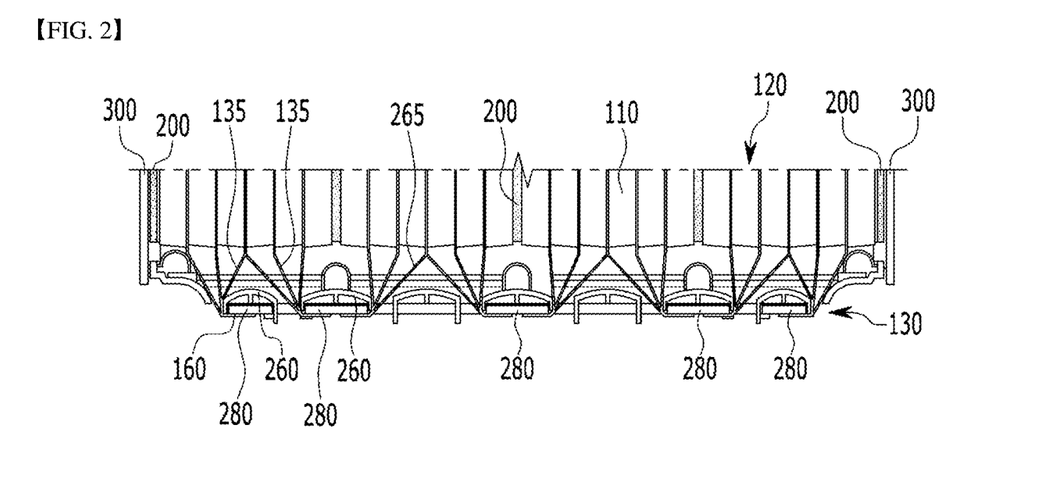
FIG. 2 is a cross-sectional view taken along the cutting line A-A' of FIG. 1.

FIG. 1 is a perspective view showing a part of a battery module according to one embodiment of the present disclosure. FIG. 2 is a cross-sectional view taken along the cutting line A-A' of FIG. 1.

Referring to FIGS. 1 and 2, the battery module 100 according to the present embodiment includes a module frame 300, a battery cell stack 120 inserted in the module frame 300, and a bus bar frame 130 located on the one open side of the module frame 300 and connected to the battery cell stack 120. The battery cell stack 120 is formed by stacking a plurality of battery cells 110 in one direction.

The module frame 300 may be in the form of a mono frame covering four surfaces except for the front surface and the rear surface of the battery cell stack 120. It means a type of frame that requires horizontal assembly in order to insert the battery cell stack 120 inside the mono frame. However, the module frame 300 is not limited to a mono frame, and may have a shape including a U-shaped frame in which an upper part surface, a front surface and a rear surface are opened, and an upper plate covering the upper part of the battery cell stack 120.

A cell terrace 135 extending from a pouch covering the battery cell 110 is formed, and electrode leads 160 protruding from the cell terrace 135 can meet and pass through one lead slot (not shown). The distance between adjacent cell terraces 135 may be increasingly narrower as the distance from the battery cell 110 increases. At this time, the electrode leads 160 protruding from the cell terrace 135 may have the same polarity as each other. When the electrode leads 160 adjacent to each other have different polarities from each other, the distance between the cell terraces 135 from which the electrode leads 160 protrude from each other may be rather widen more and more as the distance from the battery cell 110 increases.

According to this embodiment, a compression pad 200 is formed between the outermost battery cell 110 and the side surface portion of the module frame 300. The compression pad 200 may be formed using a polyurethane-based material. The compression pad 200 can absorb the deformation of the thickness of the battery cell 110 due to swelling and a change of the battery cell 110 due to an external impact. At least one compression pad 200 may be formed not only between the outermost battery cell 110 and the side surface portion of the module frame 300, but also between adjacent battery cells 110.

A pass guider 260 is formed on the bus bar frame 130. Before forming the cell terrace 135 that allows the electrode leads 160 of each of the three adjacent battery cells 110 to be extended, the electrode leads 160 are guided so as to pass through the lead slot, and may be formed on one side of the bus bar frame 130. Specifically, the bus bar frame 130 may include a pass guider 260 inside the rear surface of the bus bar frame 130 located to be separated from the battery cells 110.

The pass guider 260 may form a predetermined guide space at the rear surface of the bus bar frame 130, so that the three electrode leads 160 and the cell terraces 135 can be brought close to each other before passing through the lead slot. The pass guiders 260 may be provided in plural numbers. Here, the plurality of pass guides 260 may be provided to correspond to the number of the plurality of lead slots. Accordingly, the electrode leads 160 adjacent among the plurality of battery cells 110 form three pairs, and then the electrode leads 160 can pass through the lead slots via the respective pass guiders 260 to form a group of the electrode lead 160.

The number of electrode leads 160 forming the electrode lead 160 group is not limited to three, and may be changed according to the placement of the electrode leads of the positive electrode and the negative electrode of the battery cell 110.

Figure 3:
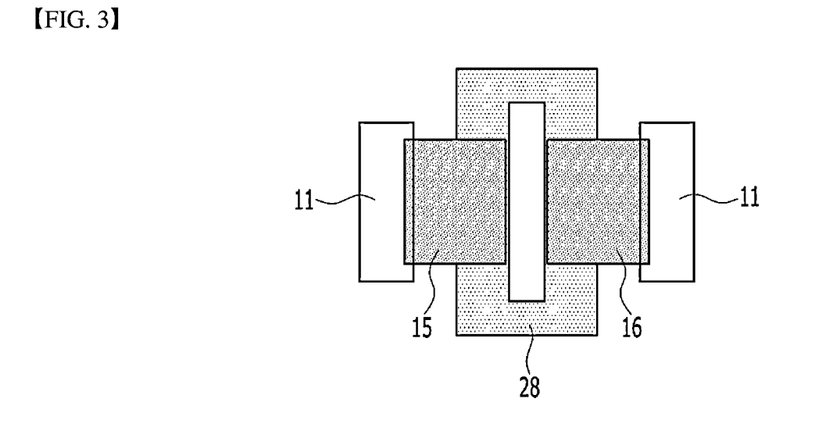
FIG. 3 is a plan view schematically showing a welded structure of an electrode lead and a bus bar according to a comparative example.
Figure 4:
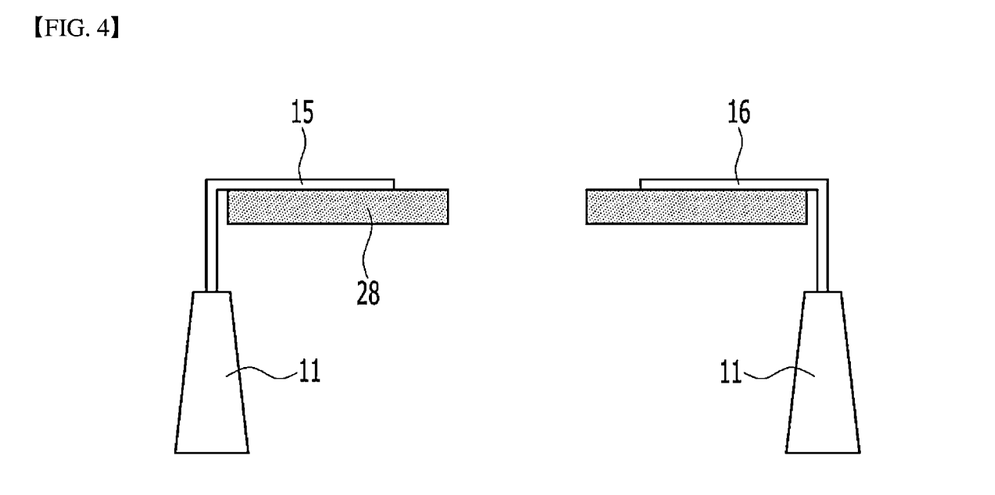
FIG. 4 is a front view showing the welded structure of FIG. 3.

FIG. 3 is a plan view schematically showing a welded structure of an electrode lead and a bus bar according to Comparative Example. FIG. 4 is a front view showing the welded structure of FIG. 3.

Referring to FIGS. 3 and 4, the bus bar 28 according to Comparative Example has an opening portion formed in the center, and can be electrically connected to the battery cell 11 via the electrode leads 15 and 16. The electrode leads 15 and 16 may have different polarities from each other, and may be connected in series via one bus bar 28. The electrode leads 15 and 16 are bent onto the bus bar 28 in a direction protruding and extending from the battery cell 11, and the bent portion of the electrode leads 15 and 16 may be welded to the bus bar 28. When the welding jig presses the overlapping portion of the electrode leads 15 and 16 and the bus bar 28 from the front surface during welding, the bus bar 28 can be bent. When the bus bar 28 is bent in this way, a gap is generated between the electrode leads 15 and 16 and the bus bar 28, which may cause welding defects.

Figure 5:
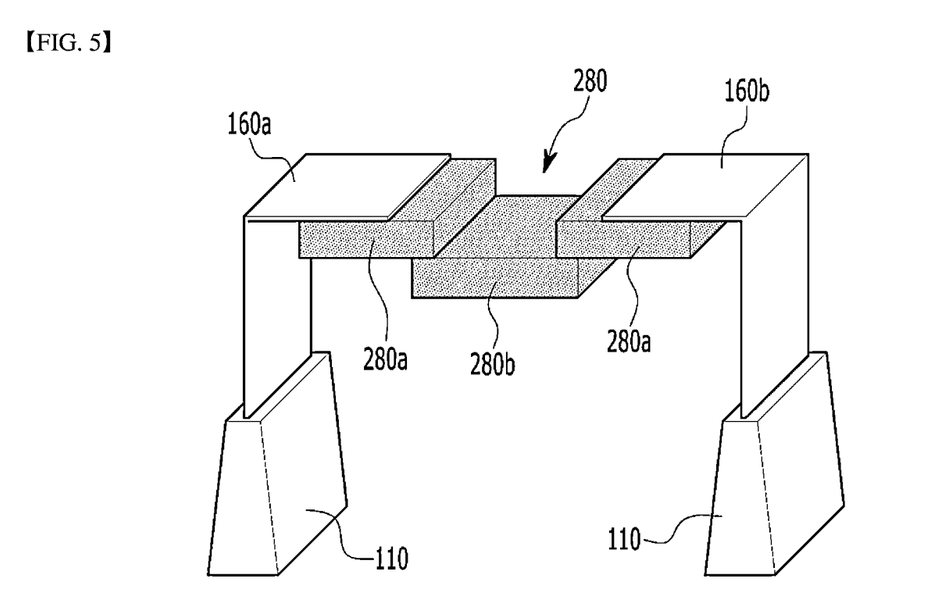
FIG. 5 is a plan view schematically showing a welded structure of an electrode lead and a bus bar according to one embodiment of the present disclosure.
Figure 6:
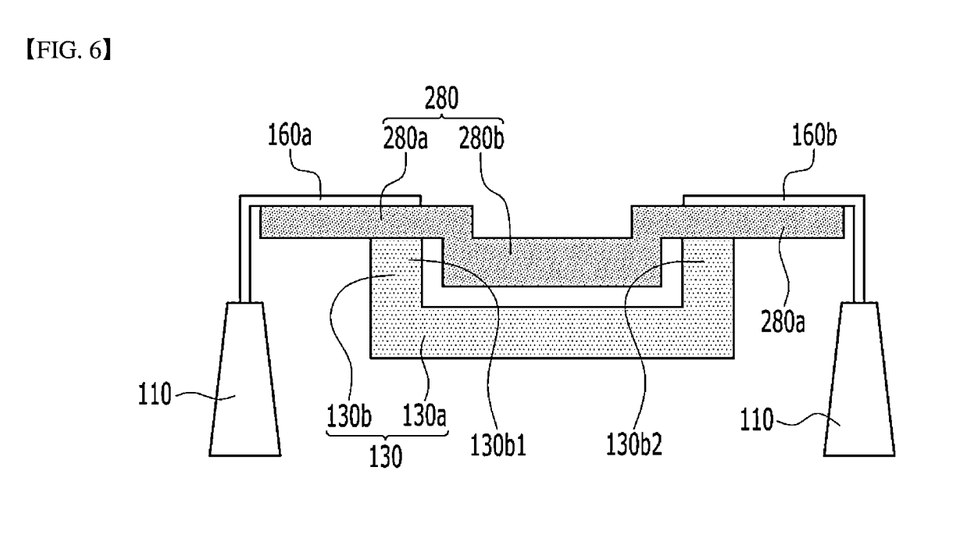
FIG. 6 is a front view showing the welded structure of FIG. 5.

FIG. 5 is a plan view schematically showing a welded structure of an electrode lead and a bus bar according to one embodiment of the present disclosure. FIG. 6 is a front view showing the welded structure of FIG. 5.

Referring to FIGS. 5 and 6, the bus bar 280 included in the battery module according to the present embodiment has a half blanking shape. The half blanking shape may refer to a form in which the punching is performed from the upper surface of the bus bar 280 of FIG. 6 to about ⅔ of the height of the bus bar 280. Specifically, the bus bar 280 according to the present embodiment includes a first portion 280a in contact with the electrode lead 160, and a second portion 280 that is recessed based on the extended surface of the first portion 280a. The second portion 280b of the bus bar 280 may be recessed toward the base bottom portion 130a of the bus bar frame 130 to be described later. The first portion 280a and the second portion 280b may be integrally formed.

The bus bar frame 130 included in the battery module according to the present embodiment includes a base bottom portion 130a and a first rib portion 130b protruding from the base bottom portion 130a. At this time, the first rib portion 130b supports the bus bar 280. The electrode leads 160a and 160b pass through the lead slot of the bus bar frame 130 and then is bent onto the bus bar 280. The bent portions of the electrode leads 160a and 160b may be welded to the bus bar 280.

The first rib portion 130b according to the present embodiment includes a first sub-rib portion 130b1 and a second sub-rib portion 130b2 adjacent to each other. The bus bar 280 includes a first portion 280a supported by each of the first sub-rib portion 130b1 and the second sub-rib portion 130b2, and a second portion 280b located between the first sub-rib portion 130b1 and the second sub-rib portion 130b2. At this time, the upper surface of the second portion 280b may have a half blanking shape that is recessed toward the base bottom portion 130a of the bus bar frame 130. At this time, the second portion 280b of the bus bar 280 may be separated from each of the first sub-rib portion 130b1 and the second sub-rib portion 130b2. A portion to which the bus bar 280 and the electrode leads 160a and 160b are welded may be located on an extension line of the first sub-rib portion 130b1 and the second sub-rib portion 130b2. The extension line of the first sub-rib portion 130b1 and the second sub-rib portion 130b2 has a direction in which the first sub-rib portion 130b1 and the second sub-rib portion 130b2 shown in FIG. 6 are extended upward.

Figure 7:
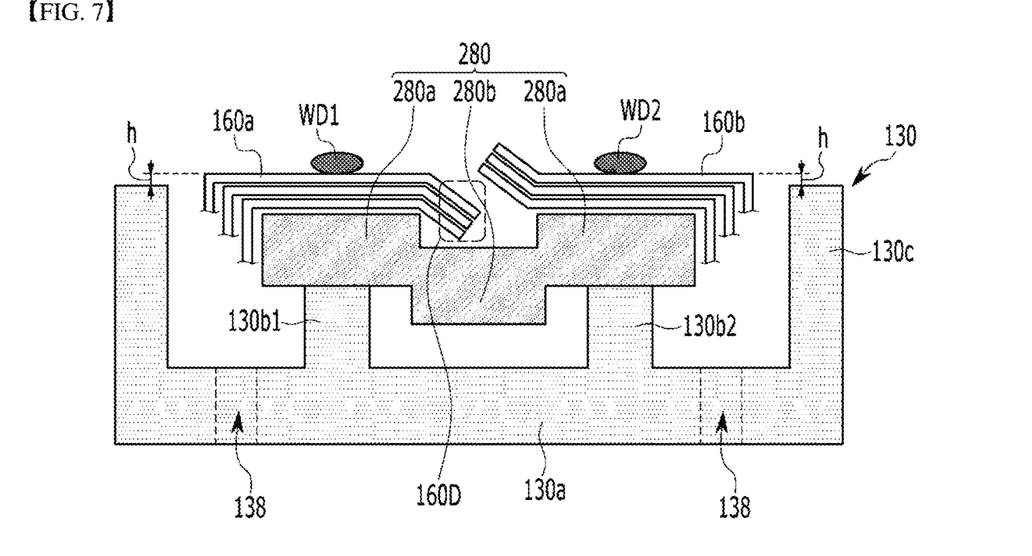
FIG. 7 is a schematic view showing a bus bar and a bus bar frame structure according to another embodiment of the present disclosure.
Figure 8:
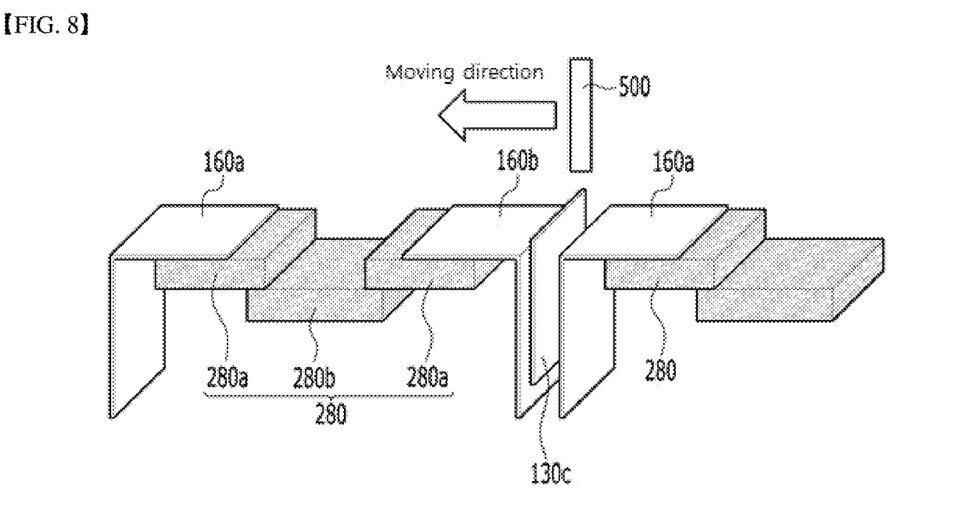
FIG. 8 is a schematic view showing a bus bar and a bus bar frame structure according to Comparative Example of FIG. 7.

FIG. 7 is a schematic view showing a bus bar and a bus bar frame structure according to another embodiment of the present disclosure. FIG. 8 is a schematic view showing a bus bar and a bus bar frame structure according to the comparative example of FIG. 7.

Referring to FIG. 7, the electrode leads 160a and 160b may be bent onto the bus bar 280 after passing through the lead slot 138 of the bus bar frame 130. In FIG. 7, the portion where the electrode leads 160a and 160b are extended and penetrate through the lead slot 138 is omitted, but the electrode leads 160a and 160b may extend in portions indicated by the dotted lines to pass through the lead slots 138.

The bent portion of the electrode leads 160a and 160b is welded onto the first portion 280a of the bus bar 280, and the electrode leads 160a and 160b may include a dummy portion 160D which is extended from the welded portion and bent toward the second portion 280b of the bus bar 280. The dummy portion 160D may be bent into a recessed portion of the second portion 280b. Additionally, an end portion of the second lead electrode 160b adjacent to the first lead electrode 160a may be bent in a direction different from the direction in which the dummy portion 160D is bent. As such, the bus bar 280 according to the present embodiment has a half blanking shape, and therefore, when the electrode leads 160a and 160b are formed long, the end portion of the electrode leads 160a and 160b may be disposed in the recessed second portion 280b. Therefore, it is possible to prevent an obstacle to the adhesion of the overlapping portion for welding of the bus bar 280 and the electrode leads 160a and 160b.

The bus bar frame 130 according to the present embodiment may further include a second rib portion 130c located between bus bars 280 adjacent to each other. The height of the second rib portion 130c may be equal to or lower than the height of the electrode leads 160a and 160b bent onto the bus bar 280. In other words, the height difference h between the electrode leads 160a and 160b and the second rib portion 130c may be the same, or the height difference may have a positive number. With this structure, welding defects can be prevented by not interfering with the bending blades of the welding machine. Specifically, referring to FIG. 8, a second rib portion 130c corresponding to a partition rib may be disposed between two adjacent bus bars 280. At this time, if the height of the second rib portion 130c is higher than the height of the surface of the outermost electrode leads 160a and 160b, a bending blade 500, which pushes the electrode leads 160a and 160b during welding to allow the electrode leads 160a and 160b to come into close contact with the bus bar 280, is interfered with the second rib portion 130c, and thus the bus bar 280 and the electrode leads 160a and 160b are not in close contact with each other, thereby causing welding defects.

Referring to FIGS. 2 and 7, a plurality of electrode leads 160 are protruded from a cell terrace 135 extending from a pouch covering the battery cells 110. The electrode leads 160 protruding from the cell terrace 135 may be bent in a direction in which the bus bar 280 is located. The bent electrode leads 160 overlap the same bus bar 280, and the plurality of electrode leads 160 and the bus bar 280 are simultaneously welded to form one welding point WD1 and WD2 at the first portion 280a of the bus bar 280, respectively.

In addition to the differences described above, the contents described for the embodiments of FIGS. 5 and 6 may be applied to the present embodiment.

Meanwhile, one or more battery modules according to the embodiment of the present disclosure can be packaged in a pack case to form a battery pack.

The above-mentioned battery module and a battery pack may be applied to various devices. These devices may be applied to vehicles such as an electric bicycle, an electric vehicle, a hybrid vehicle, but the present disclosure is not limited thereto but can be applied to transportation means such as an electric bicycle, an electric vehicle, a hybrid vehicle, but the present disclosure is not limited thereto and can be applied to various devices that can use the cylindrical battery and the battery pack including the same, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

130: bus bar frame
280: bus bar
130a: base bottom portion
130b: first rib portion
130c: second rib portion
160: electrode lead

The invention claimed is:

1. A battery module, comprising:
a battery cell stack in which a plurality of battery cells are stacked;
a bus bar frame connected to the battery cell stack and including a base bottom portion and a first rib portion protruding from the base bottom portion;
an electrode lead protruding from the battery cell stack and passing through a lead slot of the bus bar frame; and
a bus bar electrically connected to the electrode lead,
wherein the first rib portion of the bus bar frame supports the bus bar,
wherein a portion of the electrode lead that extends out of the lead slot of the bus bar frame is bent onto the bus bar and is welded to the bus bar,
wherein the first rib portion includes a first sub-rib portion and a second sub-rib portion adjacent to each other,
the bus bar includes two first portions supported by the first sub-rib portion and the second sub-rib portion, respectively, and a second portion located between the first sub-rib portion and the second sub-rib portion, and
an upper surface of the second portion has a half blanking shape that is recessed toward the base bottom portion of the bus bar frame, and
wherein a location at which the bus bar and the electrode lead are welded overlies an end surface of the first sub-rib portion or the second sub-rib portion of the bus bar frame, and the extension line of the first sub-rib portion and the second sub-rib portion has a direction in which the first sub-rib portion and the second sub-rib portion are extended upward.

2. The battery module according to claim 1, wherein the electrode lead is welded onto one of the first portions, and the electrode lead includes a dummy portion that extends from the portion of the electrode lead that is welded to the bus bar and is bent toward the second portion.

3. The battery module according to claim 2, wherein the dummy portion is bent into a recessed portion of the second portion of the bus bar.

4. The battery module according to claim 1, wherein each of the first portions of the bus bar and the second portion of the bus bar are integrally formed.

5. The battery module according to claim 1, wherein the second portion of the bus bar is spaced apart from each of the first sub-rib portion and the second sub-rib portion of the bus bar frame.

6. The battery module according to claim 1, wherein the bus bar is a first bus bar, the battery module further comprising a second bus bar adjacent to the first bus bar,
wherein the bus bar frame further includes a second rib portion located between the first bus bar and the second bus bar, and
a height of the second rib portion above a surface of the base bottom portion of the bus bar frame is equal to or lower than a height of the portion of the electrode lead that is bent onto the bus bar.

7. A battery pack comprising the battery module according to claim 1.

8. The battery module according to claim 2, wherein the electrode lead includes a first lead electrode and a second lead electrode, and an end portion of the second lead electrode adjacent to the first lead electrode is bent in a direction different from the direction in which the dummy portion is bent.

* * * * *